United States Patent Office

3,157,676
Patented Nov. 17, 1964

3,157,676
PROCESS FOR OBTAINING TRIVERNOLIN
Charles F. Krewson, Abington, William E. Scott, Levittown, and Jesse S. Ard, Glenside, Pa., assignors to the United States of America as represented by the Secretary of Agriculture
No Drawing. Filed Oct. 11, 1961, Ser. No. 144,516
4 Claims. (Cl. 260—348)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to a process for obtaining trivernolin in high yields, and particularly relates to obtaining high yields of trivernolin from *Vernonia anthelmintica* Willd.

Trivernolin, as obtained by the process of the present invention, has an oxirane oxygen content of about 4.9% or higher, or about 95% of the oxirane oxygen content of pure trivernolin, the triglyceride of vernolic acid (considered to be 12:13-epoxy-octadec-9-enoic acid). With the possibility that the trivernolin product contains other triglycerides, for example, monooleo-divernolin, analysis indicates that at least about 90% of the product is the triglyceride of vernolic acid.

Trivernolin is a desirable material for use as a plasticizer-stabilizer for polyvinyl resins. The presence of a free hydroxy group, as in divernolin, adversely affects plasticizer properties. As a chemical intermediate, trivernolin has a greater potential than vernolic acid or its other glycerides since trivernolin may be used as the source of hydrolysis products, but the reverse is not true. Retention of the epoxy function and synthesis of the triglyceride from vernolic acid is not feasible. Hence, a process for obtaining the maximum yield of trivernolin is highly desired.

In copending application entitled "Process for Isolation of Divernolin and Trivernolin," Serial No. 136,113, filed September 5, 1961, there is described the extraction of Indian iron weed (*Vernonia anthelmintica*) with petroleum ether to obtain an oil containing free vernolic acid, divernolin and trivernolin. It is not uncommon for half or more of the total vernolic acid obtainable from an extract to be present as the free acid. In one on the examples of the copending application the oil contained 38.3% vernolic acid, 5.4% divernolin, and 12.5% trivernolin.

An object of the present invention is to obtain higher yields of trivernolin from *Vernonia anthelmintica* seed. Another object is to obtain an extract relatively free of divernolin and vernolic acid, thereby simplifying the separation of trivernolin. Other objects and a better understanding of the invention may be had by referring to the following description and claims.

We have discovered that free vernolic acid and divernolin are not naturally present, at least not in any appreciable amount, in *Vernonia anthelmintica* seed, but that they are substantially the result of enzymatic hydrolysis of trivernolin. The enzymatic activity begins when the seed is ground or crushed to provide a more easily extractable material, and there is soon a considerable loss of trivernolin.

According to the invention high yields of trivernolin are obtained from the seed of *Vernonia anthelmintica* Willd. by a process comprising preventing enzymatic hydrolysis of trivernolin prior to its extraction from the seed, preparing the seed for solvent extraction, extracting trivernolin from the prepared seed with a suitable solvent such as petroleum ether, and separating the trivernolin from the extract.

A preferred embodiment of the invention comprises heating the intact seed to inactivate the enzyme which hydrolyses trivernolin, preparing the seed for solvent extraction, extracting trivernolin from the prepared seed with a solvent suitable for this purpose, for example, petroleum ether, to give an extract having a very low content of free fatty acids and relatively free of divernolin, and separating trivernolin from the extract.

Another embodiment of the invention comprises preparing the seed for solvent extraction, rapidly extracting trivernolin from the prepared seed with a suitable solvent such as petroleum ether, and separating trivernolin from the extract.

In the latter process the enzyme(s) which hydrolyzes trivernolin is(are) not inactivated. We have found that if the extraction is completed in less than about 1 hour from the time of fragmenting the seed the free fatty acid content of the extract may be as low as about 2%, but is usually about 3.5% of the weight of the oil when the time is 2–3 hours.

If the seed is subjected to dry heat under forced draft conditions at temperatures in the range of about 130 to 150° C. an oil with a free fatty acid content of less than 0.6% is obtained. We have found that seed so treated and fragmented does not increase in free fatty acid content in aging so that the time element between preparing the seed for extraction and the actual extraction is not critical as the enzyme is inactivated.

If the enzyme is inactivated by steam heating in an autoclave for 15–30 minutes at temperatures of 115–120° C. and pressures of 12–15 pounds per square inch, the free faty acid content of the oil prepared from the fragmented seed does not exceed 1%. The free fatty acid content is not altered when the autoclaved fragmented seed ages.

Live steam inactivates this enzyme in about 10 minutes.

The use of petroleum ether as the solvent for extracting trivernolin, and the isolation of trivernolin from the resulting extract, is described in co-pending application Serial No. 136,113. Upon cooling the petroleum ether extract to a temperature in the range of about −20 to −15° C. the trivernolin precipitates. When only small amounts of free fatty acids accompany the trivernolin, a recrystallization of the trivernolin from petroleum ether gives a product essentially free of fatty acids. Hence, an advantage of the present invention is that the procedure of removing free fatty acids, such as contacting the extract with aqueous methanolic alkaline hydroxide followed by water washing, may be eliminated.

If desired, or if indicated by appearance, the extract may be clarified prior to separating the trivernolin. The inclusion of this procedure will depend upon such variables as condition of the seed, amount of fines produced by fragmenting and extracting, and the type of extracting equipment employed.

Means of preparing the seed for efficient solvent extraction are well known. Flaking is a desirable procedure for preparing seeds for solvent extraction, resulting in efficient extraction of oil with a minimum content of fines.

The following examples are presented as illustrations of the practice of the invention but are not intended to be in limitation thereof. In these examples, 1 to 5 illustrate the preparation of trivernolin based upon the inactivation of the enzyme. Examples 6 and 7 pertain to rapid solvent extraction of the seed immediately after fragmenting the seed.

*Example 1*

The whole (unground) seed, moisture content 7.9%, was autoclaved about 35 minutes at 116° C. (10 psin pressure). The seed was then ground to pass a screen with 2 mm. diameter openings and 2131 grams (moisture 9.0%) was extracted with petroleum ether (B.P. 35–61° C.) six times at room temperature using approximately 20 liters of solvent. The combined extracts were concentrated and the remaining solvent removed under vacuum in a rotating evaporator to yield 410 grams of oil, 21.1% on a moisture-free basis.

Analysis of the oil gave the following values: Free fatty acid, 1.0%; oxirane oxygen, 3.86%; and Wijs iodine number, 104.7.

The major portion of the oil, 395 grams, was added to 4 liters of petroleum ether, allowed to stand overnight in a refrigerator (about 3° C.) and filtered to clarify the solution. Only traces of solids were removed, indicating absence of divernolin. More petroleum ether (about 2 liters) was added to the filtrate to give a solvent to solute ratio of about 15 to 1, and the solution allowed to stand at −20° C. to precipitate trivernolin. The trivernolin was separated by filtration, the filter cake washed with cold petroleum ether, and the solvent remaining on the cake evaporated under vacuum. Yield of trivernolin (liquid at room temperatures) was 218 grams, having a free fatty acid content of less than 0.2%, an oxirane oxygen value of 5.00%, equivalent to 96.% trivernolin, a yield of 55.2% of the oil (11.67% of the seed on a moisture-free basis).

From the combined solvent filtrates, mother liquor and cold wash, was obtained 140 grams of solids with an oxirane oxygen value of 2.13%. The overall yield of trivernolin can be increased (theoretically almost 58 grams or an additional 15%) by processing this material.

*Example 2*

This example varied from Example 1 in that after the seed was autoclaved and ground, the ground seed was allowed to air-equilibrate for 8 days before performing the solvent extraction. Results were similar to that of Example 1. There was no change in the free fatty acid content of the oil extracted, as compared with Example 1, proof of inactivation of the enzyme.

*Example 3*

The process of this example was similar to that of Example 1 with the exception that the heat treatment to inactivate the enzyme was treatment with live steam for 10 minutes. The oil contained only 1.0% free fatty acids and had an oxirane oxygen value of 3.90%. Trivernolin was separated from the oil as in Example 1, and substantially the same results were obtained.

*Example 4*

This example was similar to Example 3 except that after grinding, the ground seed was allowed to stand for 8 days before extracting the oil. There was no appreciable increase in free fatty acid content, showing that the heat treatment had inactivated the enzyme.

*Example 5*

The process of this example was similar to that of Example 1 with the exception that the heat treatment to inactivate the enzyme was subjecting the whole seed to a forced draft of air at 150° C. for 20 hours. Analysis of the oil gave a free fatty acid content of 0.5% and an oxirane oxygen value of 3.70%.

*Example 6*

This example illustrates rapid extraction of the oil to minimize the amount of enzymatic hydrolysis. Freshly ground seed, 132 grams (6.2% moisture) was immediately extracted five times with 200 ml. portions of hot petroleum ether (B.P. 63–70° C.), filtering each time. After the last extraction the marc was washed once with room temperature petroleum ether. Elapsed time from the start of grinding to the finish of the extraction was 90 minutes. The extracts were combined and the solvent evaporated to give 25.3 grams of oil, 20.7% yield on a moisture free basis.

Analysis of the oil gave a free fatty acid content of 1.9% and an oxirane oxygen value of 3.89%.

A yield of 57% trivernolin was obtained following a separation as described in Example 1.

*Example 7*

In a process similar to Example 6, one kilogram of seed was ground and the following extraction begun immediately. The ground seed was extracted for one-half hour at 40–45° C. with 1.8 liters of petroleum ether (B.P. 63–70° C.). The free solvent was separated by filtration and the marc extracted successively with four 1 liter and five ½ liter portions of hot petroleum ether. The extracts were combined and the solvent evaporated to give 188 grams (20.4% yield on dry weight basis) of oil.

Analytical evaluations of the oil are as follows: Free fatty acid, 3.5%; oxirane oxygen, 3.86%; and Wijs iodine value, 104.0.

Examples 6 and 7 illustrate that a high yield of trivernolin can be obtained from the seed without inactivating the enzyme, although even with the rapid extraction of the oil the free fatty acid content of the oil will be considerably higher than that of oil extracted from heat treated seed.

We claim:

1. The process for obtaining a high yield of trivernolin from the seed of *Vernonia anthelmintica* Willd. comprising subjecting the intact seed to steam heat at a temperature of about from 115° to 120° C. to inactivate the enzyme present therein which is capable of hydrolyzing trivernolin, preparing the thus-heated seed for solvent extraction, extracting the prepared seed with petroleum ether to give an extract containing trivernolin and a very low content of free fatty acids and which is essentially free of divernolin, and separating trivernolin from the extract.

2. The process for obtaining a high yield of trivernolin from the seed of *Vernonia anthelmintica* Willd. comprising subjecting the intact seed to dry heat at a temperature of about from 130° to 150° C. to inactivate the enzyme present therein which is capable of hydrolyzing trivernolin, preparing the thus-heated seed for solvent extraction, extracting the prepared seed with petroleum ether to give an extract containing trivernolin and a very low content of free fatty acids and which is essentially free of divernolin, and separating trivernolin from the extract.

3. The process of claim 1 wherein trivernolin is separated from the extract by cooling the extract to a temperature of about from −20° to −15° C. to precipitate the trivernolin, and recrystallizing the trivernolin in petroleum ether to obtain substantially pure trivernolin.

4. The process of claim 2 wherein trivernolin is separated from the extract by cooling the extract to a temperature of about from −20° to −15° C. to precipitate the trivernolin, and recrystallizing the trivernolin in petroleum ether to obtain substantially pure trivernolin.

References Cited in the file of this patent

UNITED STATES PATENTS

| | | |
|---|---|---|
| 2,459,820 | James | Jan. 25, 1949 |
| 2,740,799 | Young et al. | Apr. 3, 1956 |
| 2,910,363 | Rubin et al. | Oct. 27, 1959 |

OTHER REFERENCES

Paul: The Analyst, volume 46, page 238, 1924.

Williams: A Textbook of Biochemistry, D. Van Nostrand Co., Inc., reprinted November 1943, (pages 229–230 and pages 236–237 relied on).

Desnuelle et al.: Biochim. et Biophys. Acta 2, 561–74 (1948).

Smith et al., Journal of Org. Chem., volume 25, pages 218–222 (1960).

The Condensed Chemical Dictionary, 5th Edition, 1956, page 843.